(12) United States Patent
Maendel et al.

(10) Patent No.: US 11,662,144 B2
(45) Date of Patent: May 30, 2023

(54) USE OF BIOMASS FURNACE FOR DIRECT AIR-DRYING OF GRAIN AND OTHER PARTICULATE

(71) Applicant: Triple Green Products Inc., Morris (CA)

(72) Inventors: David Maendel, Headingley (CA); Lyall Wiebe, East St. Paul (CA)

(73) Assignee: Triple Green Products Inc., Morris (CA)

( * ) Notice: Subject to any disclaimer, the term of this patent is extended or adjusted under 35 U.S.C. 154(b) by 0 days.

(21) Appl. No.: 17/541,505

(22) Filed: Dec. 3, 2021

(65) Prior Publication Data

US 2022/0136768 A1 May 5, 2022

Related U.S. Application Data

(63) Continuation of application No. PCT/CA2021/051042, filed on Jul. 26, 2021.

(60) Provisional application No. 63/056,170, filed on Jul. 24, 2020.

(51) Int. Cl.
*F26B 23/02* (2006.01)
*F23B 30/00* (2006.01)
*F23J 13/00* (2006.01)
*F26B 21/10* (2006.01)
(Continued)

(52) U.S. Cl.
CPC ............ *F26B 23/022* (2013.01); *F23B 7/002* (2013.01); *F23J 13/00* (2013.01); *F26B 21/10* (2013.01); *F26B 21/12* (2013.01); *F26B 17/1408* (2013.01); *F26B 2200/06* (2013.01)

(58) Field of Classification Search
CPC ........ F26B 23/022; F26B 21/10; F26B 21/12; F26B 17/1408; F26B 2200/06; F26B 23/02; F26B 17/124; F26B 21/001; F23B 7/002; F23J 13/00
See application file for complete search history.

(56) References Cited

U.S. PATENT DOCUMENTS 2,688,196 A * 9/1954 De ................... F26B 11/185
432/108
4,052,255 A * 10/1977 Hackbarth ............... B01D 1/18
159/45
(Continued)

FOREIGN PATENT DOCUMENTS

GB 973244 A * 10/1964

*Primary Examiner* — Edelmira Bosques
*Assistant Examiner* — Bao D Nguyen
(74) *Attorney, Agent, or Firm* — Kyle R Satterthwaite; Ryan W Dupuis; Ade & Company Inc.

(57) ABSTRACT

A heating apparatus for supplying heated air to a dryer for grain or other particulate materials. The apparatus features a biomass furnace with a burn chamber for combustible biomass material, a chimney having a lower end in fluid communication with the burn chamber interior, and air ducting that has a fresh air inlet, an output end connected or connectable to the dryer, and is in in fluid communication with the chimney to enable redirection of said heated exhaust air from the chimney to the dryer via the air ducting. An airflow control system is configured to both control airflow to the dryer through the air ducting, and control a temperature of said airflow by varying a ratio between the fresh ambient air and the heated exhaust air.

18 Claims, 12 Drawing Sheets

(51) Int. Cl.
*F26B 21/12* (2006.01)
*F26B 17/14* (2006.01)

(56) References Cited

U.S. PATENT DOCUMENTS

| | | | | |
|---|---|---|---|---|
| 4,523,906 A | * | 6/1985 | Petrovic | C01F 11/46 432/27 |
| 4,953,535 A | * | 9/1990 | Hagan | F23M 9/003 126/307 R |
| 8,973,285 B2 | | 3/2015 | Fujitomo | |
| 2010/0320186 A1 | * | 12/2010 | Elazari-Volcani | A61M 5/44 219/201 |
| 2013/0036624 A1 | * | 2/2013 | Fujitomo | F26B 17/1416 34/68 |
| 2014/0090560 A1 | * | 4/2014 | Buzanowski | B01D 39/10 95/287 |

\* cited by examiner

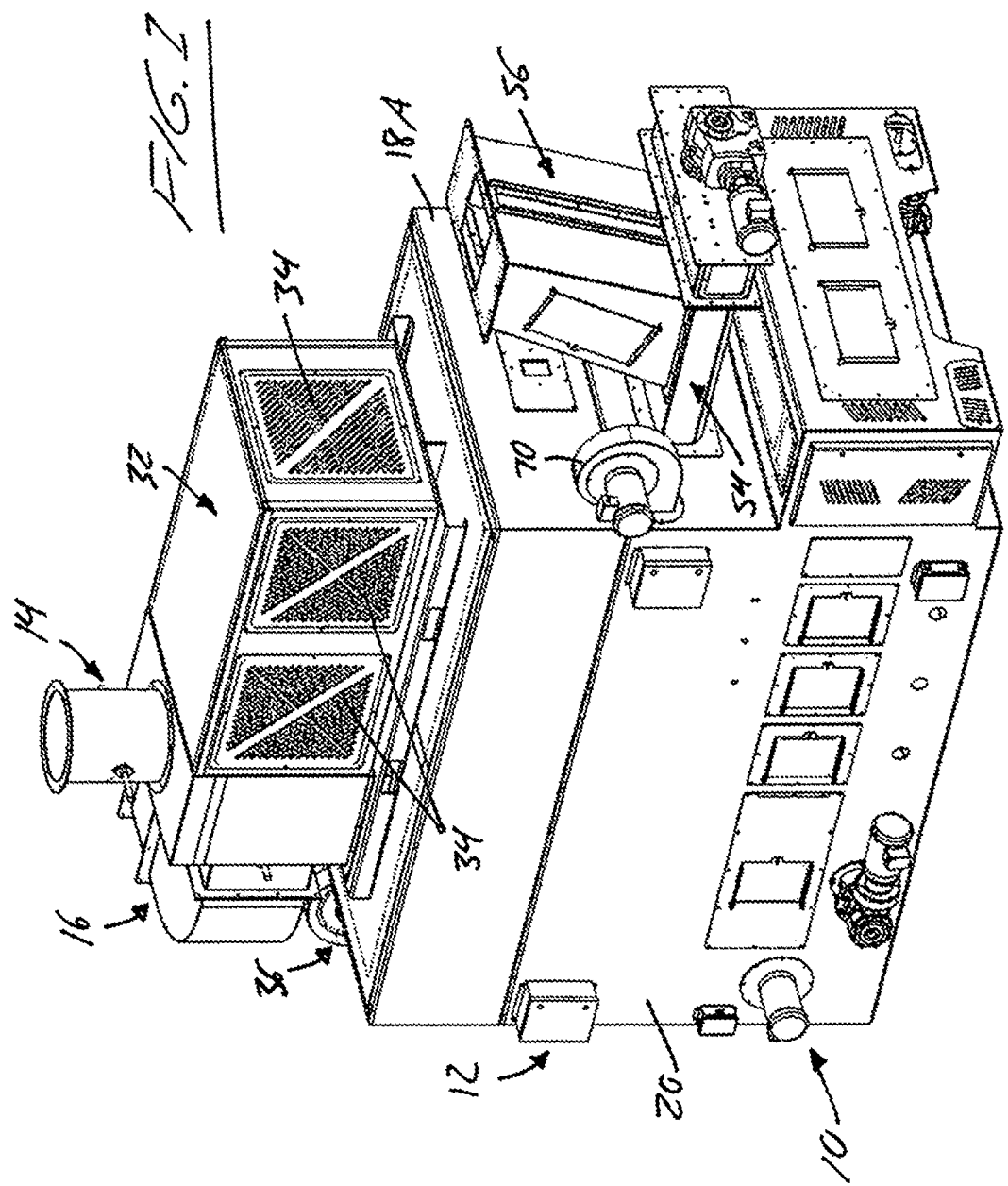

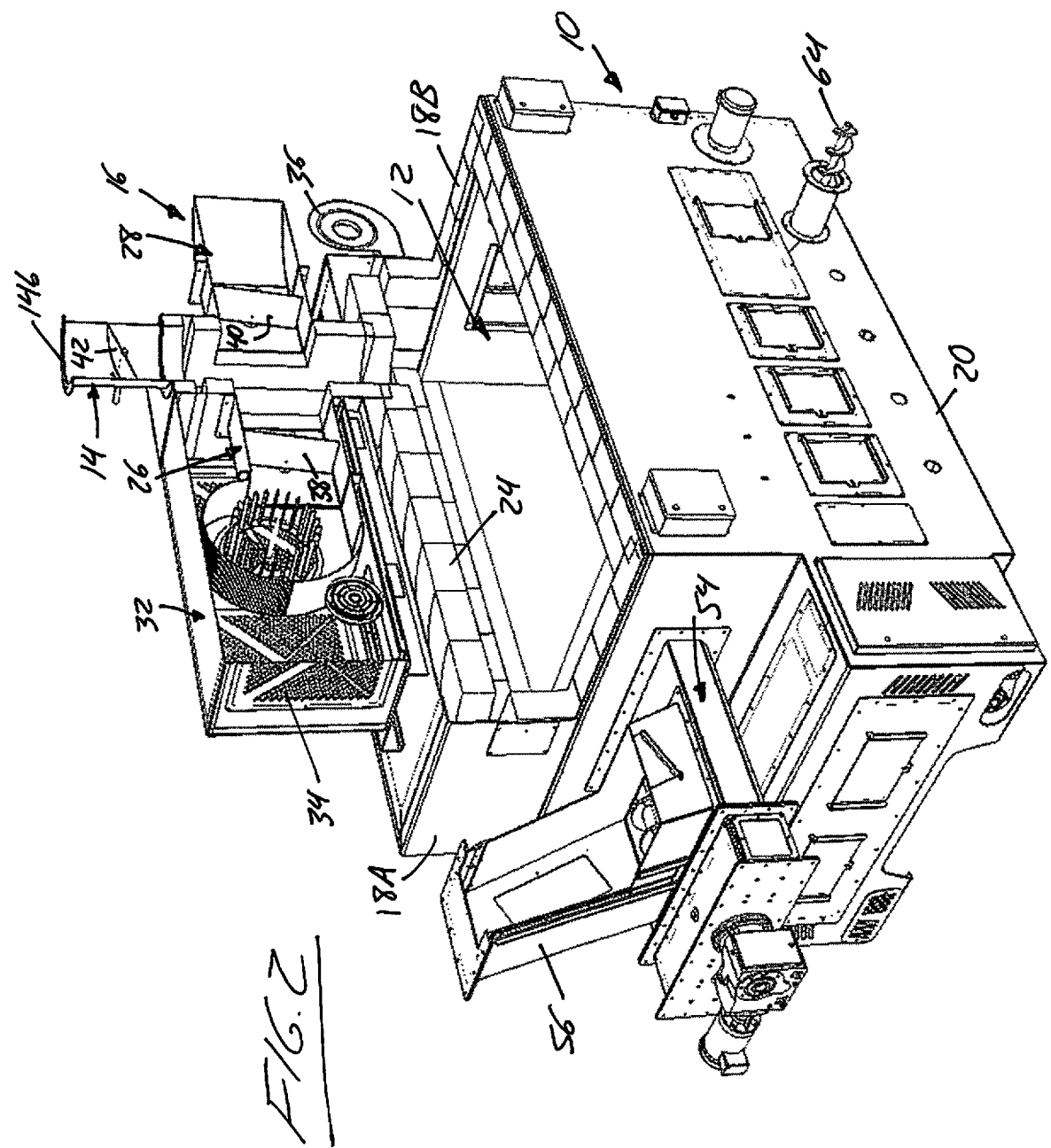

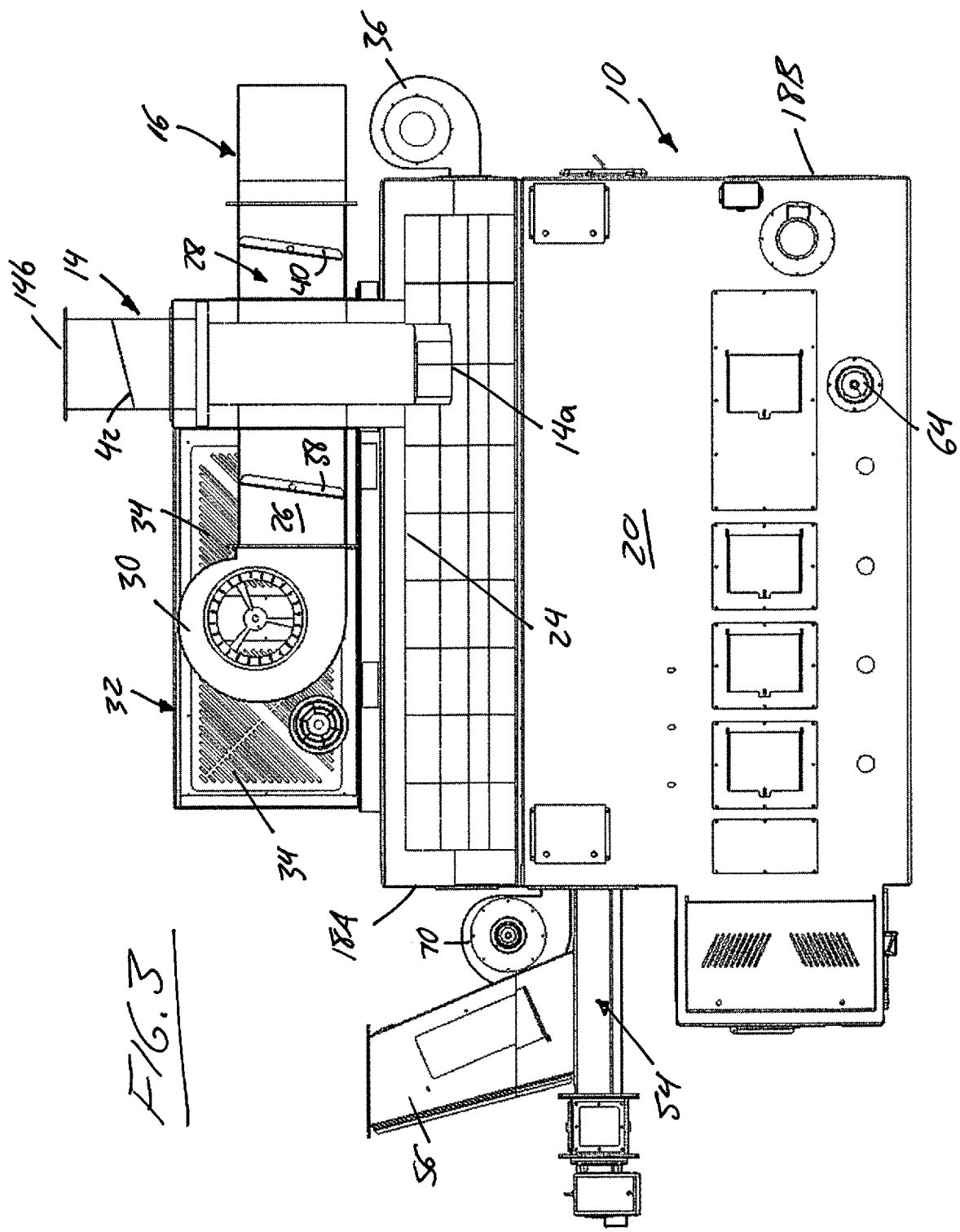

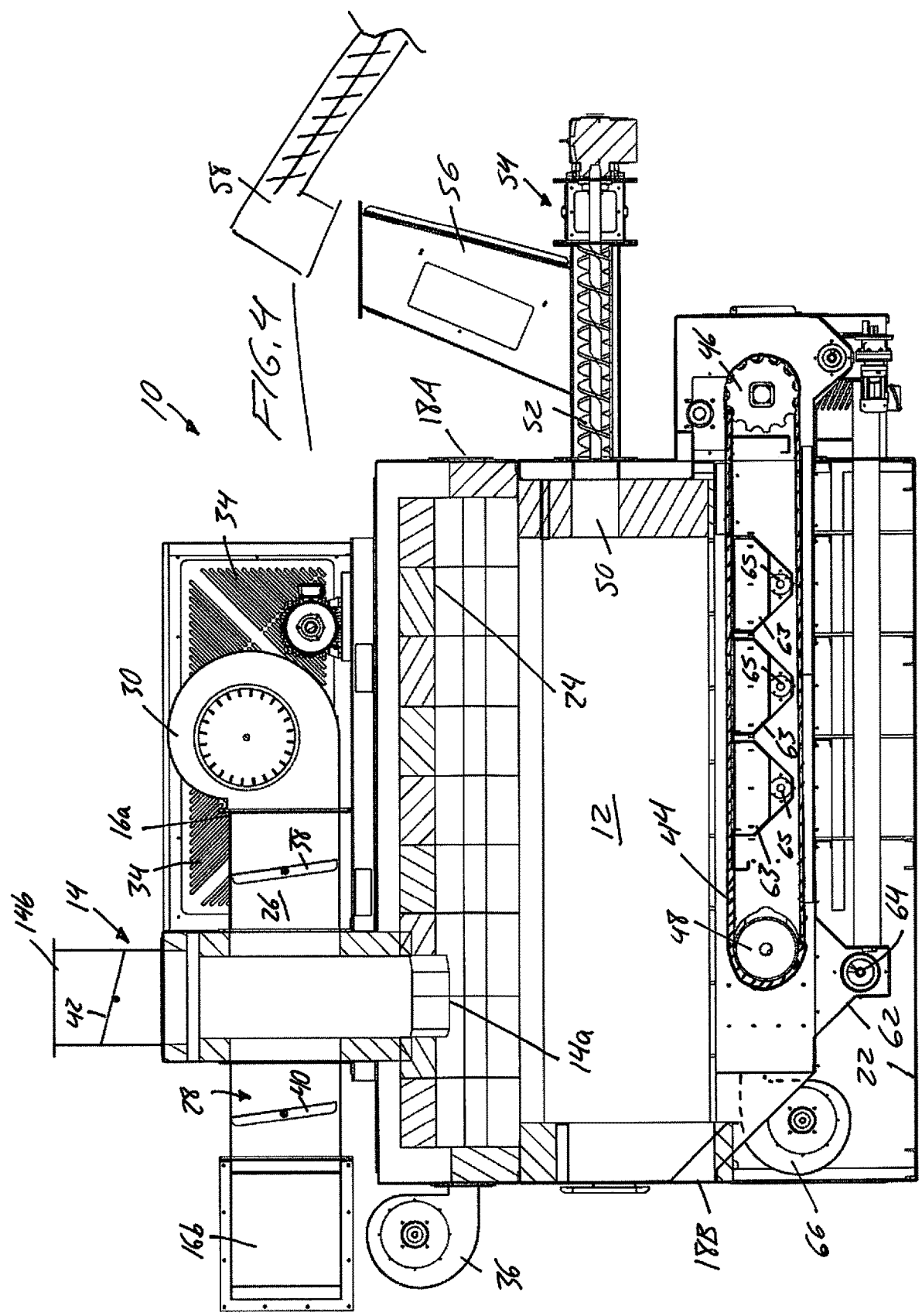

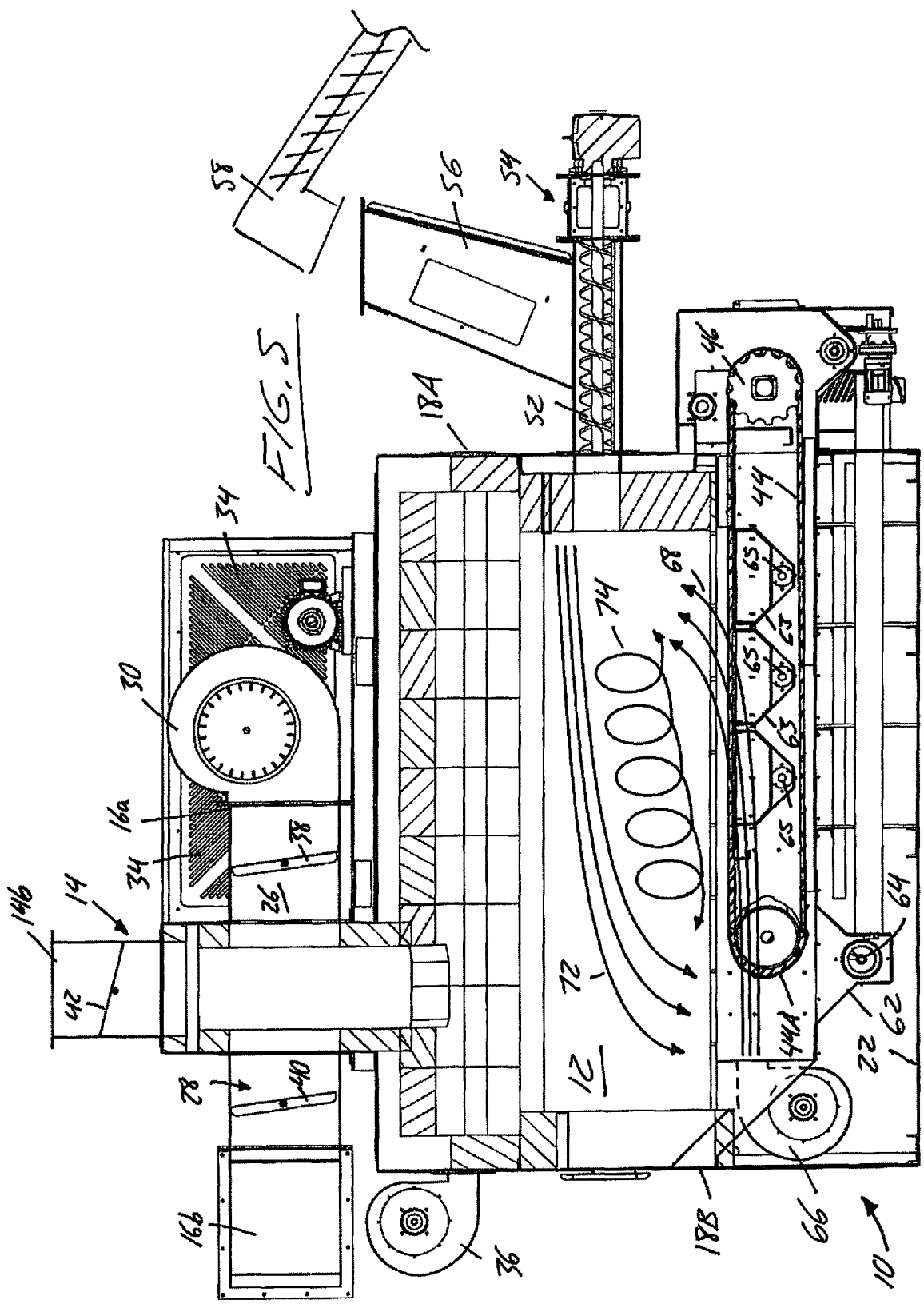

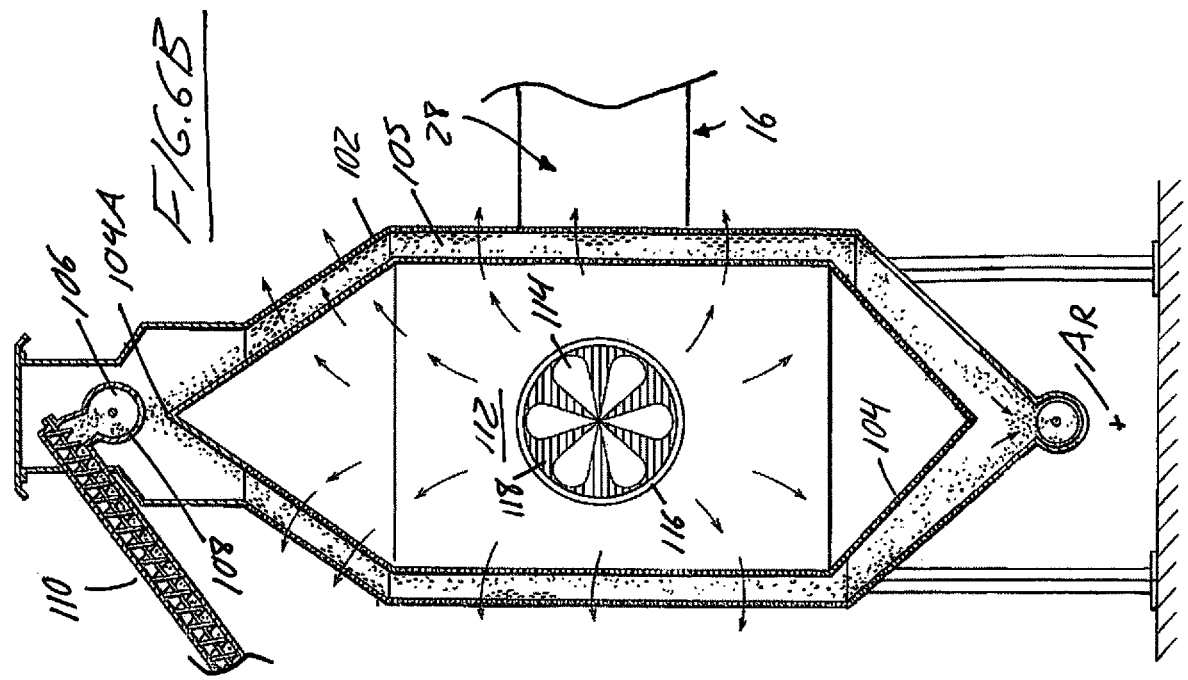
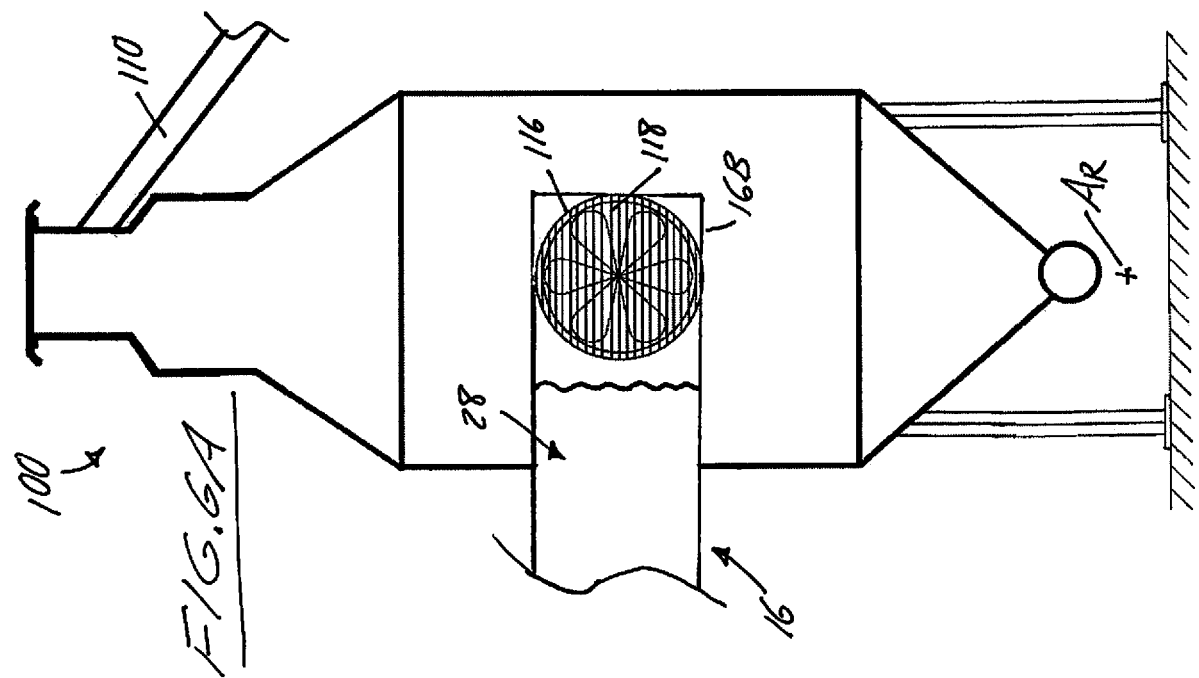

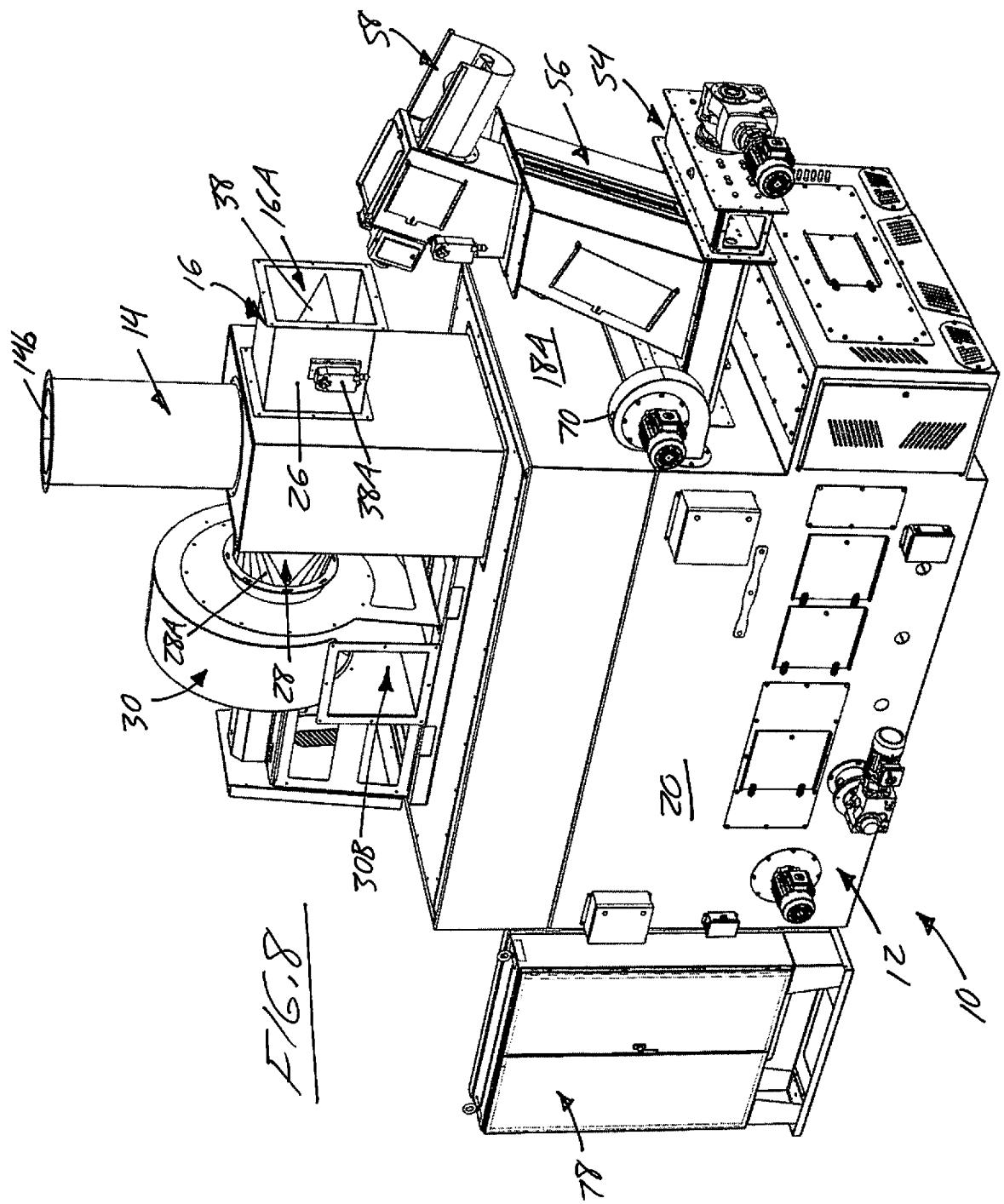

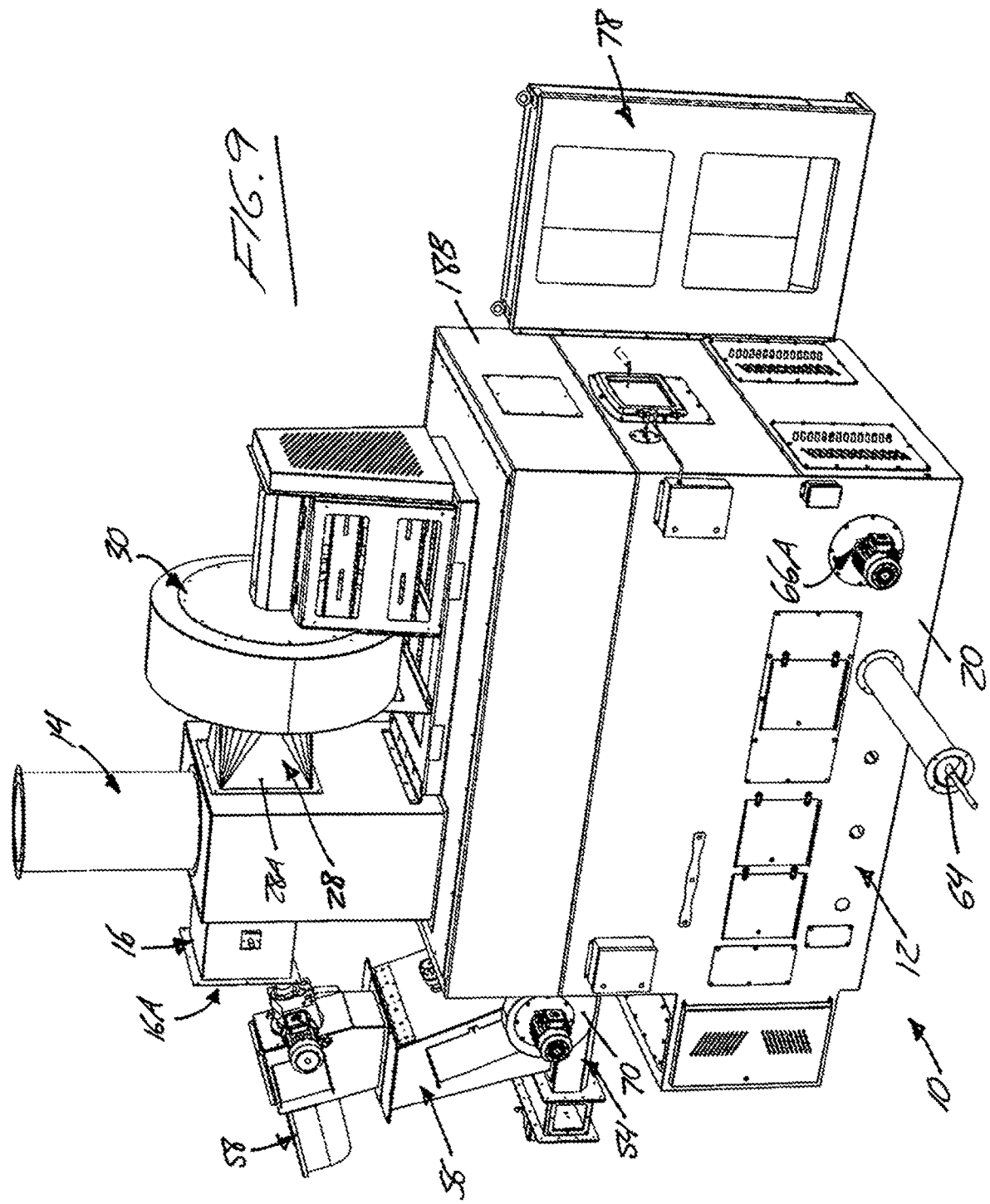

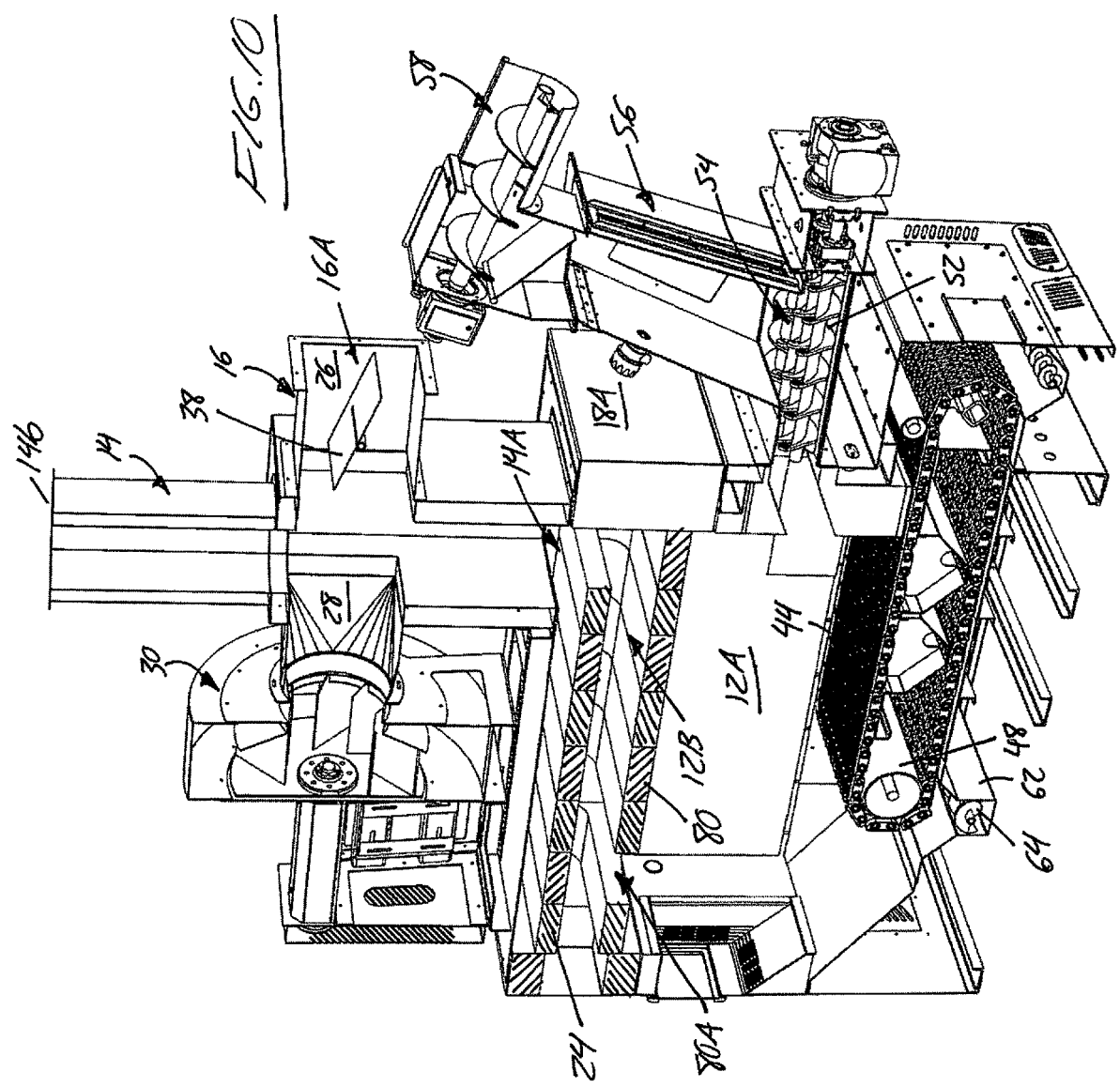

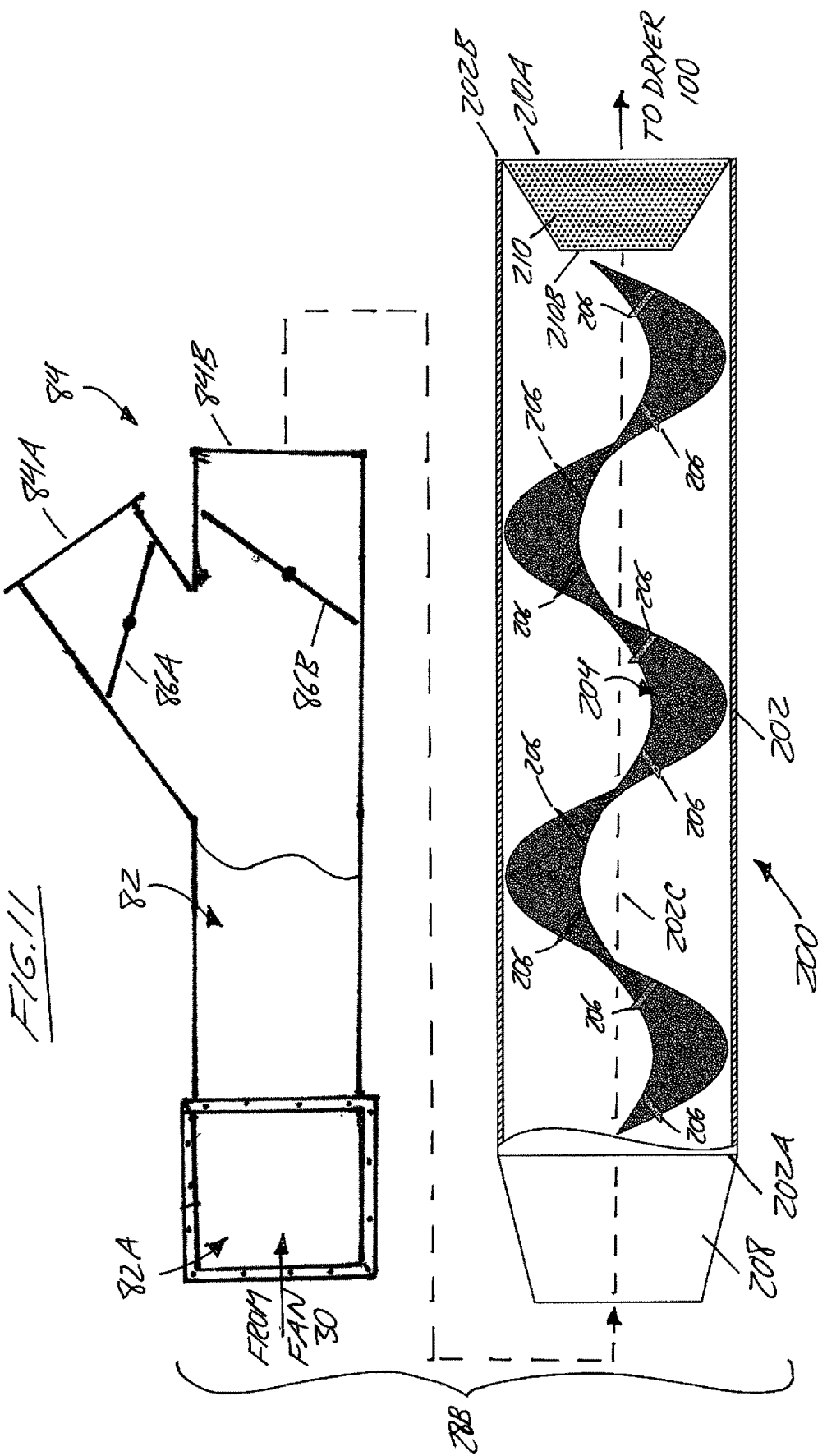

USE OF BIOMASS FURNACE FOR DIRECT AIR-DRYING OF GRAIN AND OTHER PARTICULATE

CROSS-REFERENCE TO RELATED APPLICATIONS

This application is a continuation of International PCT Application No. PCT/CA2021/051042, filed Jul. 26, 2021, which claims benefit under 35 USC 119(e) of U.S. Provisional Patent Application No. 63/056,170, filed Jul. 24, 2020, both of which are incorporated herein by reference in their entirety.

FIELD OF THE INVENTION

The present invention relates generally to dryers for drying grain or other particulate materials, and more particularly to use of a biomass furnace as a heat source for a particulate dryer.

BACKGROUND

Conventionally, grain dryers used in the agricultural industry to remove excess moisture from harvested or stored grain have relied on combustion of fossil fuels (such as propane or natural gas) to generate a supply of heated air for the dryer. For the purpose of reducing costs and net carbon emissions, it would be desirable to instead use a biomass fuel source for such purpose, as leftover biomass material from an agricultural harvesting operation is often readily available for such purpose. This use of existing biomass fuel reduces fuel costs for the farmer, and also presents a carbon neutral solution, or at least solution of significantly reduced carbon footprint compared to conventional fossil fuel solutions.

U.S. Pat. Nos. 8,973,285 and 9,719,722 each disclose a grain drying facility in which a biomass furnace is used as a heat source for the grain dryer. Two separate streams of heated air from the biomass furnace feed the dryer: a first indirectly-heated airstream from a heat exchanger warmed by the hot combustion exhaust, and a second directly-heated airstream containing the hot combustion exhaust, which is mixed with ambient air before entering the grain dryer. The directly-heated airstream is specifically routed through a set of heating tubes in the dryer, which penetrate across the interior grain space of the dryer, whereby the grain itself is never directly exposed to the hot exhaust from the biomass furnace. Instead, the grain is heated by contact with the exterior of the heating tubes through which the mixture of exhaust and ambient air is routed, thereby maintaining isolation of the combustion exhaust from the grain space of the dryer.

Bennet et al. (Bennett, Albert; Bern, Carl; Richard, Tom; & Anex, Robert. (2007). Corn Grain Drying Using Corn Stover Combustion and CHP Systems. Transactions of the ASAE. American Society of Agricultural Engineers. 50. 2161-2170. 10.13031/2013.24076.) also disclosed use of a biomass combustion as a heat source for a grain dryer, and likewise employed an indirect heating approach in order to maintain isolation between the combustion exhaust and the grain due to expressed concern over the relatively high chlorine and ash content in the combustion exhaust. Bennet et al. also employed the biomass combustion to generate electricity for running fans, augers and control equipment.

While these references exemplify the desire to switch from fossil fuels to biomass as a fuel source for grain drying, there remains room for improved and alternatives solutions for such a transition.

SUMMARY OF THE INVENTION

According to a first aspect of the invention, there is provided a heating apparatus for supplying heated air to a dryer for particulate materials, said heating apparatus comprising:

a biomass furnace comprising a burn chamber having an interior space in which combustible biomass material is receivable and combustible to generate heat; and a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;

air ducting having a fresh air inlet in fluid communication with the surrounding ambient environment to admit fresh ambient air therefrom, and an output end connected or connectable to the dryer, said air ducting being in fluid communication with the chimney at a location upstream from said output end to enable redirection of said heated exhaust air from the chimney to the dryer via said air ducting; and an airflow control system configured to both control airflow to the dryer through said air ducting, and control a temperature of said airflow by varying a ratio of said fresh ambient air to said heated exhaust air within said airflow.

According to a second aspect of the invention, there is provided, in combination with a dryer for particulate materials, a heating apparatus comprising:

a biomass furnace comprising a burn chamber having an interior space in which combustible biomass material is receivable and combustible to generate heat; and a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;

air ducting having a fresh air inlet in fluid communication with the surrounding ambient environment to admit fresh ambient air therefrom, and an output end connected or connectable to the dryer, said air ducting being in fluid communication with the chimney for routing of said heated exhaust air from the chimney to the dryer via said air ducting; and an airflow control system configured to both control airflow to the dryer through said air ducting, and control a temperature of said airflow by varying a ratio of said fresh ambient air to said heated exhaust air within said airflow;

wherein the output end of said air ducting is connected to the grain dryer at an air intake thereof that is in fluid communication with an internal grain space of the dryer to which grain is introduced for drying, whereby the airflow from the biomass furnace is fed into said internal grain space for direct drying of the grain by permeation of said airflow through the grain.

According to a third aspect of the invention, there is provided, heating apparatus for supplying heated air to a dryer for particulate materials, said heating apparatus comprising:

a biomass furnace comprising a burn chamber having an interior space in which combustible biomass material is receivable and combustible to generate heat; and a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;

air ducting having a fresh air inlet in fluid communication with the surrounding ambient environment to admit fresh ambient air therefrom, and an output end connected or connectable to the dryer, said air ducting intersecting the chimney at a location between the upper and lower ends thereof to enable redirection of said heated exhaust air from the chimney to the dryer via said air ducting; and an airflow control system configured to both control airflow to the dryer through said air ducting, and control a temperature of said airflow by varying a ratio of said fresh ambient air to said heated exhaust air within said airflow.

According to a fourth aspect of the invention, there is provided a spark arrest apparatus comprising a duct, and a perforated screen of helically coiled shape installed within said duct in a position placing a central longitudinal axis of said helically coiled shape in longitudinally lying relationship to said duct.

BRIEF DESCRIPTION OF THE DRAWINGS

Preferred embodiments of the invention will now be described in conjunction with the accompanying drawings in which:

FIG. 1 is a perspective view of a heating apparatus of a first embodiment of the present invention for supplying heated air to a grain dryer.

FIG. 2 is another perspective view of the first embodiment heating apparatus of FIG. 1, but shown from an opposing side thereof and partially cross-sectioned in a vertical reference plane.

FIG. 3 is a side elevational view of the first embodiment heating apparatus of FIG. 2.

FIG. 4 is a side elevational view of the first embodiment heating apparatus of FIG. 3, but shown from an opposing side thereof and fully cross-sectioned in a vertical reference plane.

FIG. 5 is a cross-sectioned side elevational view of the first embodiment heating apparatus in the same cutting plane as FIG. 4, but showing circulating air currents inside a furnace burn chamber of the apparatus.

FIG. 6A illustrates connection of air ducting of the first embodiment heating apparatus of FIGS. 1 to 5 to a grain dryer, which is shown in elevational view from one end thereof.

FIG. 6B is another end elevational view of the grain dryer of FIG. 6A, but from an opposing end thereof and shown fully cross-sectioned in a vertical plane.

FIG. 8 is a perspective view of a modified second embodiment of the heating apparatus.

FIG. 9 is another perspective view of the second embodiment heating apparatus of FIG. 8, but shown from an opposing side thereof.

FIG. 10 is another perspective view of the second embodiment heating apparatus of FIG. 8 from the same side thereof, but cross-sectioned in a vertical reference plane.

FIG. 11 illustrates part of the air ducting of the second embodiment, particularly at downstream part thereof that connects to the grain dryer and that features a branched output duct having normal and bypass outlets, and a spark arrestor connected to said normal outlet.

DETAILED DESCRIPTION

Figure 7:
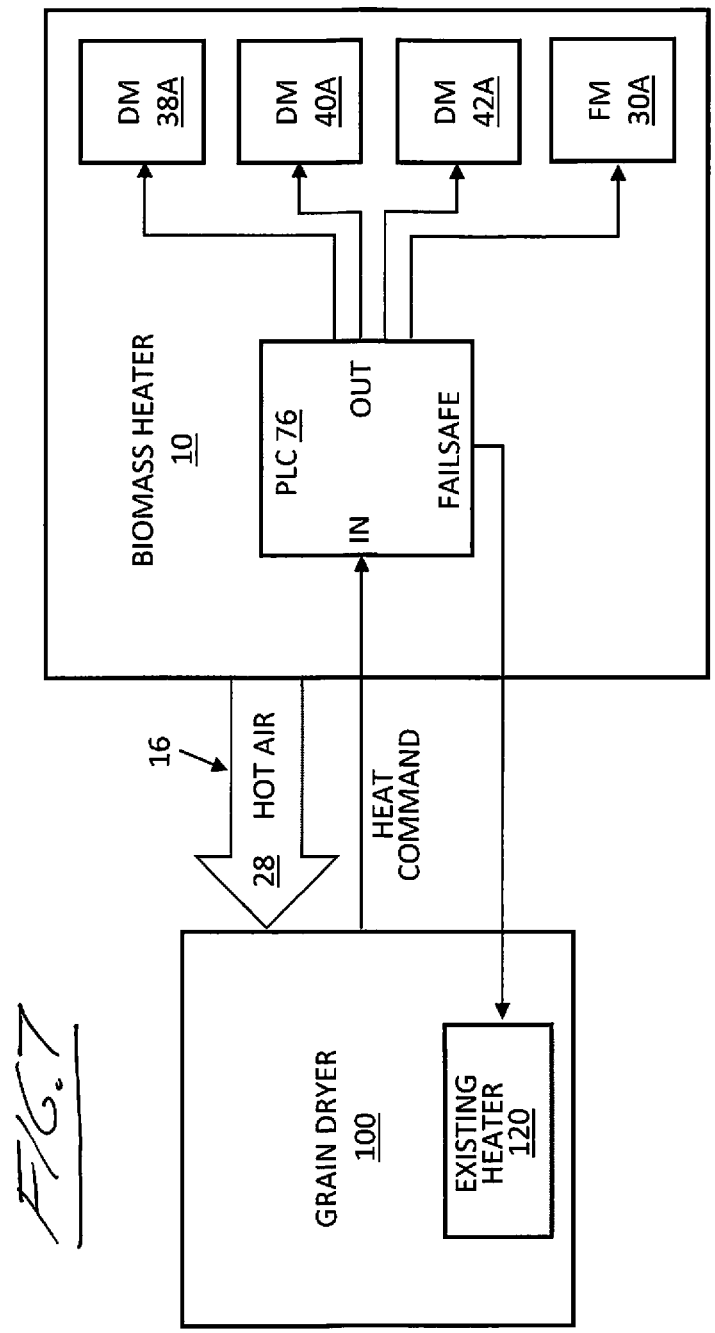
FIG. 7 is a schematically illustrates a control system of the first embodiment heating apparatus, as installed in relation the grain dryer of FIG. 6.

FIGS. 1 to 3 show a heating apparatus of the present invention for supplying heated air to a grain dryer, or to another dryer for drying other types of particulate material (gypsum, granular fertilizer, etc.). The apparatus comprises a biomass furnace 10 having an internal burn chamber 12, a chimney 14 emanating upwardly from a top of the furnace 10 to enable emission of hot exhaust air from the burn chamber 12 to a surrounding ambient environment outside the furnace, and air ducting 16 through which such hot exhaust air can be redirected to the grain dryer for the purpose of drying grain therein, rather than releasing said hot exhaust air to the ambient environment. The burn chamber 12 is delimited by opposing first and second end walls 18A, 18B spaced horizontally apart in a longitudinal direction of the burn chamber, a pair of opposing side walls 20 spaced apart in a lateral direction measured perpendicularly transverse of the longitudinal direction, a stationary lower floor 22 denoting the bottom of the burn chamber from which the side and end walls stand upright, and an opposing ceiling 24 that is vertically spaced from the lower floor 22 in elevated relation thereover and caps off the side and end walls. The side and end walls and the ceiling are internally lined with refractory brick to withstand the high temperatures experienced in the burn chamber 12 during combustion of biomass materials therein.

The chimney 14 penetrates the ceiling 24 of the burn chamber 12, and a lower end 14a of the chimney fluidly communicates with the burn chamber 12 at an upper region thereof. The opposing upper end 14b of the chimney resides outside the burn chamber in elevated relation over the ceiling 24 thereof, thus residing fully outside the furnace 10 in order to exhaust to the surrounding ambient environment. As shown in the illustrated embodiment, the chimney 14 preferably hangs downward a short distance from the ceiling 24, whereby the lower end 14a of the chimney resides at a slightly lower elevation than the ceiling interior. As a result, sparks that float along the ceiling interior during combustion of biomass fuel inside the burn chamber are less likely to enter the chimney 14. To further reduce or prevent spark admission to the chimney 14, a spark arrest fan 36 is mounted to the furnace at a positioning aiming its forced air outlet horizontally toward the chimney 14 at an elevation slightly beneath, or overlapping with, the lower end 14a of the chimney. This way, forced air outputted by the spark arrest fan 36 blows across the open lower end 14a of the chimney to further prevent or reduce the likelihood of sparks floating up into the chimney from the burn chamber 12.

The air ducting 16 intersects the chimney 14 at an intermediate elevation thereon situated between the lower and upper ends 14a, 14b thereof. The air ducting 16 resides externally above the ceiling 24 of the burn chamber 12, and thus resides fully outside the furnace 10. The air ducting 16 has an intake section 26 residing on a first side of the chimney 14, and an output section 28 residing on an opposing second side of the chimney. In the illustrated embodiment, the air ducting runs longitudinally of the furnace above the burn chamber ceiling 24, with the output section 28 thus overhanging one end of the furnace 10, though the air ducting could alternatively run in the lateral direction. An inlet end 16a of the air ducting 16 is denoted by an end of the intake section 26 opposite the chimney 14. Here, a fresh air intake fan 30 is attached to the inlet end 16a of the air ducting 16 to feed fresh ambient air thereinto from the surrounding ambient environment. As shown in the illustrated embodiment, the fresh air intake fan 30 and the intake section 26 of the air ducting 16 are optionally contained in a perforated enclosure 32, whose upright walls are equipped with perforated screens or grilles 34 allowing admission of the fresh ambient air to the fresh air intake fan 30 and the connected intake section 26 of the air ducting.

The fresh air intake section 26, at a downstream end thereof opposite the inlet end 16a of the air duct, opens into the chimney 14 at the first side thereof. At an intermediate location between the fresh air intake fan 30 and the chimney 14, the intake section 26 of the air ducting 16 contains an adjustable upstream damper 38. This damper 38 is movable between different positions to control the relative openness of the air intake section 26 of the air ducting 16, thereby enabling control over the volume of fresh ambient air being fed onward to the chimney 14 by the fresh air intake fan 30. An upstream end of the air ducting's output section 28 opens into the chimney 14 at a position across from the downstream end of the fresh air intake section 26. An opposing downstream end of the output section 28 defines a terminal output end 16b of the air ducting. Here, the air ducting is connectable to an air intake of the grain dryer to feed airflow from the biomass furnace into the grain dryer, and more specifically into an internal grain space thereof so that grain therein is dried via direct exposure to this airflow from the biomass furnace. At an intermediate location between the chimney 14 and the output end 16b of the air ducting, the output section 28 of the air ducting 16 contains an adjustable downstream damper 40. This damper 40 is movable between different positions to control the relative openness of the output section 28 of the air ducting 16, thereby enabling control over the volume of airflow travelling from the chimney 14 to the grain dryer.

An adjustable chimney damper 42 is installed in the chimney 14 at an elevation below the upper end 14b thereof, and above where the chimney is intersected by the intake and output sections 26, 28 of the air ducting 16. The chimney damper 42 is movable between different positions to control the relative openness of the chimney at an upper section situated above the air ducting 16. This damper 42 thus enables control over whether, and to what degree, the stream of hot exhaust air exiting the burn chamber 12 is split between the chimney 14 and the output section 26 of the air ducting 16. The fraction of hot exhaust air discharged to the ambient environment through the chimney 14 is referred to as waste exhaust, since it serves no functional purpose; while the fraction of hot exhaust air routed to the grain dryer via the output section 26 of the air ducting 16 is referred to as useful exhaust, since it is put to purposeful use in the grain dryer. Through operation of the fresh air intake fan 30 and upstream damper 38, a variable amount of fresh ambient air can be fed from the intake section 26 to the intersection area at which the air ducting and chimney intersect. Here, this fresh ambient air mixes with the stream of hot exhaust rising through the chimney, thereby forming a mixture of fresh ambient air and useful exhaust that flows onward to the grain dryer through the output section of the air ducting 16. By varying the motor speed of the fresh air intake fan 30, and/or the position of the upstream damper 38, the volumetric flow rate of the mixed airflow to the grain dryer can be varied, as can the temperature of the mixed airflow, which is determined by the relative composition of the mixed airflow (i.e. fractional content of hot exhaust air vs. fresh ambient air).

Accordingly, the fresh air intake fan 30 and the dampers 38, 40, 42 serve as mechanical airflow control components of an airflow control system that is configured to both control airflow to the dryer through said air ducting, and control a temperature of said airflow by varying a ratio of said fresh ambient air to said heated exhaust air within said airflow. As described in more detail below with reference to FIG. 7, an electronic controller cooperates with a fan motor 30A of the fresh air intake fan 30, and damper motors 38A, 40A, 42A of the three adjustable dampers 38, 40, 42, in order to automatically control the mixed airflow composition ratio and resulting mixed airflow temperature by varying the fan speed, the damper positions, or combinations thereof. For a grain dryer, to avoid burning of the grain, preferably the controller is configured to target a mixed airflow temperature that does not exceed 250° F., and that more particularly is in a range between 180° F. and 200° F.

Additional internal details of the biomass furnace are revealed in the fully cross-sectioned view of FIG. 4. The furnace of the illustrated embodiment employs a chain grate 44 to define a moving support atop which a bed of biomass material is both held, and longitudinally advanced through the burn chamber. The chain grate 44 is entrained in a closed loop about a pair of horizontal shafts 46, 48 that span in the lateral direction of the burn chamber, and are spaced apart from one another in the longitudinal direction thereof. One of these shafts is a motor-driven driveshaft 46, driven rotation of which causes the chain grate 44 to travel in entrained fashion about the two shafts 46, 48, the other of which may be a non-driven idler shaft. An upper half of the chain grate's closed-loop travel path forms the moving support for the biomass material, which is introduced into the burn chamber through a fuel port 50 in the first end wall 18A of the burn chamber. The biomass material is introduced to the burn chamber through the fuel port 50 by one or more motor-driven feed screws 52 of a mechanical stoker 54. The stoker 54 is attached to the exterior of the furnace's first end wall 18A, for example at a position above a drive housing of the chain grate's driveshaft 46. Like the stoker 54, the drive housing resides outside the burn chamber 12 so that all the drive components of the chain grate 44 and stoker 54 are isolated from the extreme operating temperatures of the burn chamber 12, and also remain readily accessible. The feed screw(s) 52 are gravitationally fed with biomass material from an overlying hopper 56 mounted atop the mechanical stoker 54. Preferably the hopper 56 is loaded with the biomass material via loading conveyor 58, for example a U-trough auger whose discharge spout is positioned over a fill-opening of the hopper 56 at the top end thereof, as schematically shown in FIGS. 4 and 5.

Biomass material is fed into the burn chamber 12 through the fuel port 50 by driven rotation of the feed screw(s) 52 of the mechanical stoker 54. From the fuel port 50, the biomass material falls onto the top half of the chain grate 44, where the biomass material is ignited, for example using a suitably placed electric ignitor (not shown). Motor driven operation of the driveshaft 46 advances the top half of the chain grate 44 toward the second end of the furnace, carrying the burning biomass material with it. The resulting ash eventually falls from the chain grate 44 at a terminal end 44A thereof where the chain grate 44 wraps around the idler shaft 48 to reverse its travel direction and loop back to the drive shaft 46. From this terminal end 44A of the chain grate 44, the ash falls into a main collection hopper 62 that spans across the burn chamber between the side walls 20 thereof at a position overlying the chamber floor 22 and underlying the chain grate's terminal end 44A. A main discharge auger 64 is rotatably supported at the bottom of the main collection hopper 62, and is operable to discharge the collected ash out of the burn chamber 12 through an opening in one of the two side walls 20 thereof. Through simultaneous operation of the loading auger 58, mechanical stoker 54 and chain grate 44, biomass material is continually fed into the burn chamber 12 and conveyed longitudinally therethrough as it burns, while the resulting ash is continually discharged from the burn chamber 12 by the simultaneous ongoing operation of the main discharge auger 64. As shown in FIG. 4, in addition to the main collection hopper 62 underlying the terminal end 44A of the chain grate 44, one or more preliminary collection hoppers 63 with respective cleanout augers 65 may span across the chain gate 44 between the top and bottom runs of the chain grate's closed loop path. These preliminary collection hoppers 63 collect ash that prematurely falls from the top run of the chain grate 44 before reaching the terminal end 44A thereof.

To achieve a more complete burn of the biomass fuel than compared to other biomass furnaces, the furnace includes means for creating tumbling air currents inside burn chamber. At least one under-bed circulation fan 66 is mounted on or near the second end wall 18B in a position with its forced air outlet situated at an elevation slightly below the top run of the chain grate 44, and aimed longitudinally toward the opposing first end wall 18A of the burn chamber. The under-bed circulation fan 66 blows a first stream of circulation air 68 in a direction of reverse relation to the travel direction of the moving bed of burning biomass, through which this first air circulation stream 68 rises upwardly via airflow openings in the links of the chain grate. A slightly negative air pressure may be maintained in the upper part of the burn chamber above the chain grate via one or more exhaust fans, whereby this lower pressure in the upper part of the chamber encourages such upward draw of the first air circulation stream 68 through the moving bed of burning biomass. Additionally, or alternatively, baffles may be included to encourage such upward airflow through the moving bed of burning biomass. This flow of circulation air upwardly through the moving bed of biomass helps ensure adequate oxygen richness into and through the biomass fuel to enable thorough combustion.

At least one over-bed circulation fan 70 is mounted on or near the first end wall 18A of the burn chamber 12 in a position with its forced air outlet at an elevation spaced above the top run of the chain grate, and aimed toward the opposing second end wall 18B. The over-bed circulation fan 70 blows a second stream of circulation air 72 in a direction that matches the travel direction of the burning biomass, and thus is in reverse relation to the first air circulation stream 68 from the under-based airflow fan 66. The opposing direction of these two air circulation streams 68, 72 originating from below and above the moving bed of burning biomass results in creation of tumbling air currents 74 above the moving bed of burning biomass. Without being limited to an particular theory of operation, the creation of such tumbling air currents is believed to improve the completeness of combustion, and thereby achieve cleaner exhaust air suitable for direct exposure to the grain in the grain dryer without any consequential level of grain contamination.

Though the tumble-inducing multi-fan circulation setup is believed particularly effective to ensure suitable exhaust air quality to avoid grain contamination, it will be appreciated that novel aspects of the heating apparatus by which the exhaust and fresh ambient air are mixed and directed onward to a grain dryer may nonetheless be employed regardless of how a sufficiently clean level is combustion is enabled in the furnace itself to ensure no dangerous contamination level in the exhaust-exposed grain.

FIGS. 6A and 6B illustrate connection of the output section 28 of the air ducting 16 of the heating apparatus to a grain dryer 100. The grain dryer has a dual-shell structure composed of an outer shell 102 and an inner shell 104, both of which are diamond shaped in cross-sectional planes lying normal to a longitudinal reference axis $A_R$ of the structure. In the longitudinal direction denoted by this reference axis (normal to the viewing plane of FIGS. 6A, 6B), the structure has an elongated horizontal length that notably exceeds a horizontal width of the structure, the latter of which is measured perpendicularly of said length (left to right in the viewing plane of FIGS. 6a, 6B). The outer shell 102 surrounds in the inner shell 104 in concentrically spaced relation thereto, thus leaving an open grain space 105 between the two shells, into which grain can be received. Each diamond-shaped shell 102, 104 has a pair of angled top walls of downwardly divergent relation to one another, a pair of angled bottom walls of downwardly convergent relation to one another, and a pair of vertical side walls that join the bottom ends of the angled top walls to the top ends of the angled bottom walls. A grain intake auger 106 is rotatably supported in an upper intake channel 108 that runs longitudinally of the structure above an upper apex 104A of the inner shell 104. One end of this channel 108 thereof receives undried grain from a loading conveyor 110, and the grain intake auger 106 distributes the undried grain over the length of the channel 108, from which the grain falls into the grain space 105 between the shells 102, 104 on both sides of the inner shell 104.

The walls of both shells 102, 104 are perforated to enable airflow therethrough, as shown with arrows in FIG. 6B. The interior of the inner shell 104 denotes a hollow plenum space 112 into which drying air is fed by a dryer intake fan 114 that is housed in a cylindrical fan housing 116 at a location outside both shells of the structure at one end thereof. Normally, absent the novel biomass heating apparatus of the present invention, an intake end of this fan housing 116 would be equipped with a cover grille 118 through which ambient air would be drawn from the surrounding environment, and a gas burner (not shown) of a fossil fuel heater would be operably installed in the fan housing 116 at a location downstream of the dryer intake fan 114 and upstream of the plenum space 112. Thus, absent the novel heating apparatus of the present invention, the fossil fuel heater of the grain dryer would warm the ambient air being blown into the plenum space 112 by the dryer intake fan 114. From the plenum space 112, the heated air permeates outwardly through the grain space 105, as shown in FIG. 6B, thus drying the received grain contained therein.

When using the novel biomass heating apparatus of the present invention, the output end 16b of the air ducting 16 is coupled to, or at least placed in closely-adjacent relation and fluid communication with, the intake end of the fan housing 116 of the grain dryer 100. Accordingly, this air intake of the grain dryer, instead of drawing unheated ambient fresh air from the surrounding ambient environment, now receives the mixed airflow from the biomass furnace 10. Through the fan housing 116, this mixed airflow is routed onward into the plenum space 112, and onward through the grain space 105 that fluidly communicates with the plenum via the perforations in the inner shell 104 of the structure. The grain dryer 100 thus uses the exhaust air from the biomass combustion (in a mixture of appropriate ratio with fresh ambient air to achieve a suitable grain-drying air temperature that won't burn the seed) to directly dry the seed through direct air contact therewith. In a newly constructed grain dryer intended specifically for use with the novel heating apparatus, the conventional gas burner may be omitted from the grain dryer entirely. Alternatively, gas burner may be included, for example as back-up redundancy in case of an operational failure of the novel heating apparatus, or in the event of a shortage of biomass fuel therefore. Likewise, the dryer intake fan 114 of the grain dryer 100 may optionally be omitted, provided that the fresh air intake fan 30 of the heating apparatus is sufficient to feed the dryer's airflow requirements.

In the case where the novel heating apparatus is used with an existing grain dryer having an operational fossil fuel heater with one or more such gas burners, an electronic controller 76 (e.g. programmable logic controller) of the heating apparatus 10, whose output terminals are operably connected to the mechanical componentry of the airflow control system to automatically control the fan motor 30A and damper motors 38A, 40A, 42A thereof, may also have an input terminal to which a command signal line of the grain dryer's existing fossil fuel heater 120 is connected. This way, a command signal calling for heat, based on detected air temperature in the grain dryer by one or more existing sensors of the existing fossil fuel heater, is intercepted by the electronic controller 76 of the novel heating apparatus 10. Receipt of this signal is used by the electronic controller of the novel heating apparatus to control operation of the mechanical components 30A, 38A, 40A, 42A of the airflow control system to deliver an appropriate mixture of biomass combustion exhaust and fresh ambient air to satisfy the hot air requirements of the grain dryer.

For use when the original fossil fuel heater 120 of the grain dryer is left intact for redundancy purposes, the electronic controller 76 of the novel heating apparatus 10 may include a failsafe output terminal for wired connection to an existing controller of the dryer in place of the original command signal line that was rerouted to the novel heating apparatus. This way, the electronic controller 76 of the novel heating apparatus 10 can send a failsafe command signal to the existing heater 120 to command operation thereof should the novel heating apparatus 10 fail to fulfill the heat requirements of the dryer. Such failure may be detected by the electronic controller of the novel heating apparatus based on feedback from one or more operational status sensors installed in the novel heating apparatus 10, or by repeated receipt of ongoing command signals from the dryer, thus signifying a failure of the heating apparatus to the meet the heating demands of the dryer.

It will be appreciated that FIG. 7 is a simplified control schematic focused on particular operation of the damper and fan motors for the purpose of controlling the novel blending of combustion and ambient air, and the delivery of this hot air mixture to the grain dryer 100. Other componentry of the stoker furnace also operated in automated fashion by the controller 76 has been omitted from the schematic for the purpose of illustrative simplicity, particularly since general operational control of chain grate stoker furnaces are well known from other heating applications (e.g. steam boilers).

A second embodiment of the heating apparatus 10' is illustrated in FIGS. 8 through 11, and to avoid redundancy, is described primarily in terms of the modified features thereof that differ from the first embodiment, without descriptive duplication of features that remain substantially unchanged. The fresh air intake fan 30 is once again mounted atop the furnace 10 outside the burn chamber 12 thereof on one side of the chimney 14 that stands upright from the burn chamber near the first end wall 18A. However, instead of drawing ambient air directly from the ambient environment and then blowing same across the chimney into an output section of the ductwork on an opposing side of the chimney, the fresh air intake fan 30 of the second embodiment instead pulls air from the chimney 14 and from the fresh air intake section 26 of the ductwork, which in the second embodiment, resides upstream of the fresh air intake fan 30 and across the chimney 14 therefrom. The inlet end 16a of the air ducting 16 is thus open to the ambient environment on a side of the chimney 14 opposite the fresh air intake fan 30 in this modified embodiment. The fresh air intake fan 30 is thus installed in the output section 28 of the air ducting 16, an upstream portion 28A of which thus connects the intake fan 30 to the chimney 14 at a position across the chimney from the intake section 26. An outlet 30B of the fresh air intake fan feeds into a downstream portion 28B (shown separately in FIG. 11) of the output section 28 of the air ducting, which in turn leads to the grain dryer 100.

Once again, operation of the fresh air intake fan 30 is operable to displace a stream of ambient intake air crosswise through the chimney 14 in order to mix with the hot exhaust air rising therethrough, but in the second embodiment, the position of the fresh air intake fan 30 in the air ducting 16 is of downstream relation to the chimney 14, whereby the fresh air intake fan sucks ambient intake air across the chimney from the intake section 26 of the air ducting into the output section 28 thereof, rather than pushing the ambient intake air across the chimney 14 from the intake section 26 into the output section 28. As a result of this repositioning of the fresh air intake fan 30, more ambient air can optionally be drawn into the air ducting, when needed to further reduce the output air temperature of the heating apparatus, by operating the fan at sufficiently elevated speeds to cause back-drafting in the upper section of the chimney 14, i.e. whereby ambient air from the surrounding environment can be pulled downwardly into the chimney from the top end 14b thereof, thus supplementing the ambient air that is being pulled in through the intake end 16A of the air ducting 16.

Still referring to external features visible from outside the burn chamber 12, the second embodiment also illustrates inclusion of a control panel cabinet 78 in which the PLC or other controller 76 and its control panel are protectively housed in a manner accessible to an operator. As shown, the control panel cabinet 78 may reside at a location offset or spaced from the burn chamber, for example in the interest of ensuring cooler operating temperatures for the electrical equipment contained inside the cabinet 78.

With reference to the cross-sectional view of FIG. 10, attention is now turned to modified internal features of the second embodiment. In the first embodiment, the interior space of the burn chamber 12 was a singular undivided space of uninterrupted vertical span from the chain grate 44 to the uppermost ceiling 24 of the burn chamber 12. In the second embodiment, the interior space of the burn chamber is instead a divided space featuring a lower sub-chamber 12A in which the chain grate 44 resides and combustion takes place, and an upper sub-chamber 12B that's separated from the lower sub-chamber by a divider wall 80 that spans laterally and longitudinally across the interior space at a spaced distance below the uppermost ceiling 24 and above the chain grate 44. The divider wall 80 thus defines a drop ceiling of the lower sub-chamber 12A and a floor of the upper sub-chamber 12B, the latter of which thus denotes an attic space of the overall burn chamber. A break or opening 80A in the divider wall 80 is provided near the second end wall 18B of the burn chamber 12, thus residing in distally spaced relation to the chimney 14 whose bottom end 14A communicates with the upper sub-chamber 12B near the first end wall 18A of the burn chamber. As a result of this internal division of the burn chamber 12, flames from the combusting biomass on the chain grate 44 are prevented from reaching up into the chimney 14 above, instead being blocked by the divider wall 80, which, as shown, is preferably composed at least partially of refractory brick.

Figure 10A:
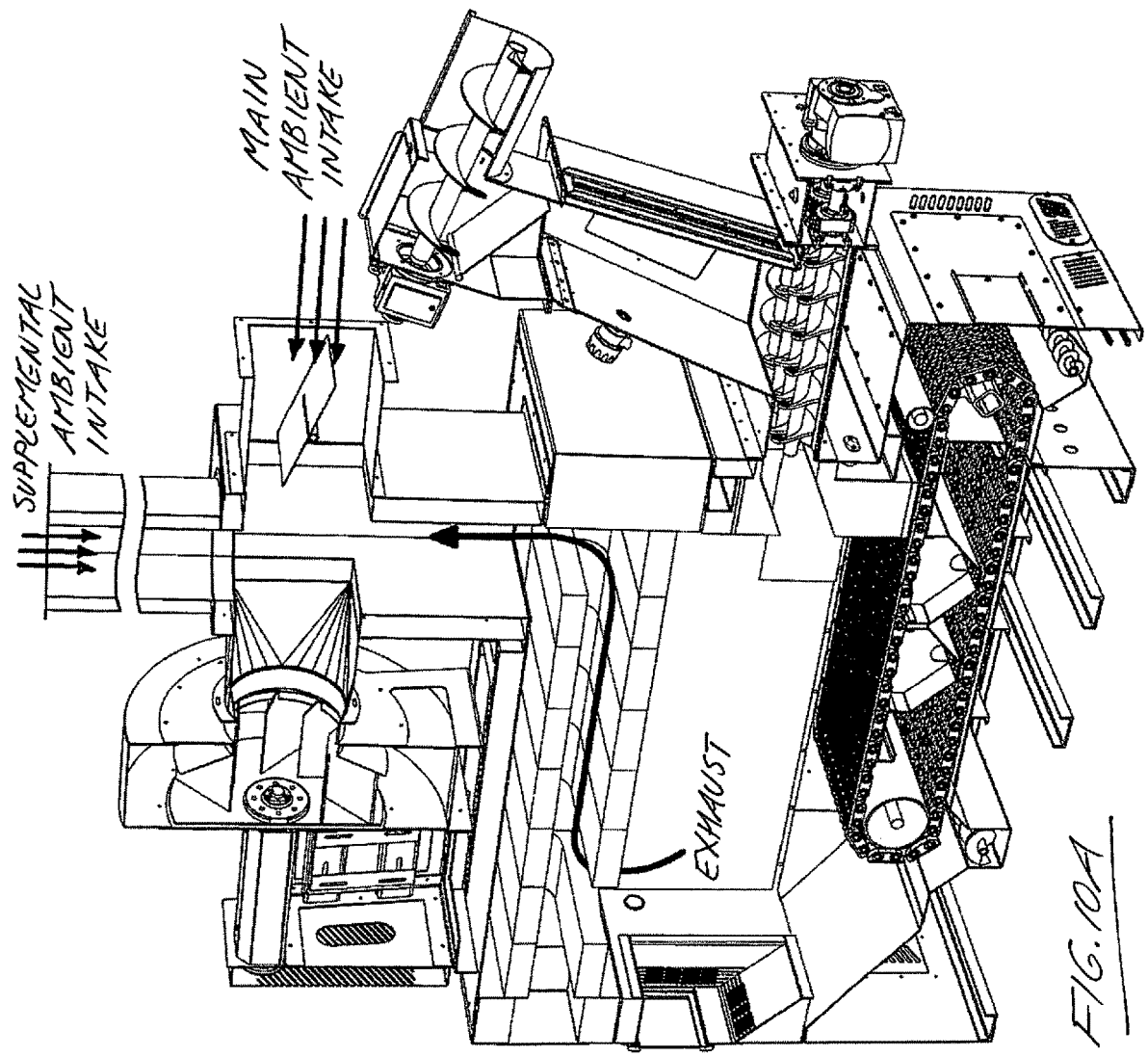
FIG. 10A is a cross-sectioned perspective view similar to FIG. 10, but schematically illustrating airflow within the heating apparatus.

In addition, hot exhaust air and any sparks carried thereby likewise cannot rise straight up into the chimney 14 from the chain grate 44, with the exhaust air instead being forced to follow an elongated serpentine path first flowing toward the second end wall 18B of the chamber (preferably in the same tumbling fashion described for the first embodiment using the combination of underbed and overbed circulation fans 66, 70, of which an overbed fan 70 and underbed fan motor 66A can both be seen in FIG. 9), then up through the divider wall opening 80A, then back toward the first end wall 18A of the chamber, and finally up into the bottom end 14A of the chimney 14. This indirect exhaust path is schematically illustrated in FIG. 10A, which also shows the optional supplementation of ambient air by overdriving the intake fan 30 at sufficiently high speeds to induce backdraft in the upper section of the chimney 14.

This use of a divided attic space forcing an indirect serpentine exhaust path with at least one direction change required to reach the chimney from the chain grate combustion bed increases the exhaust air's travel distance to reduce carriage of sparks into the chimney, thus demonstrating an alternative way to mitigate chimney spark risk compared to the first embodiment where a spark arrest fan 36 was instead included, and specifically positioned to blow past a hanging bottom end of the chimney that was intentionally offset below the chamber ceiling 24. The second embodiment thus omits this downwardly elevational offset of a hanging bottom end of the chimney from the ceiling 24 of the burn chamber. As an extra spark precaution, one or more spark arrestor screens may be installed in the lower section of the chimney to snuff out any errant sparks before they reach the chimney/duct intersection point where the exhaust air mixes with the fresh ambient air.

FIG. 11 schematically shows the downstream portion 28B of the output section 28 of the air ducting 16 of the second embodiment, which in the illustrated example includes a branched output duct 82 and an inline spark arrestor 200. In the installed state of the second embodiment heating apparatus 10', the branched output duct 82 has a proximal end 82A thereof coupled to the outlet 30B of the fresh air intake fan 30 to direct the mixed airflow therefrom onward to the grain dryer 100, in similar fashion to the first embodiment illustration in FIG. 6. The branched output duct 82 in the second embodiment differs from the first embodiment in that is has a branched distal end 84 with two discrete outlets 84A, 84B. Outlet 84A is a bypass outlet that exhausts to the ambient environment, while outlet 84B is a normal operating outlet connected to the fan housing 116 of the grain dryer 100 to normally feed the air mixture thereto. A bypass damper 86A is provided in the bypass outlet 84A, and a shut-off damper 86B is provided in the normal operating outlet 84B, and the respective damper motors thereof are operably connected to output terminals of the controller 76. When heat is required by the grain dryer 100, denoting a normal operating mode of the heating apparatus, bypass damper 86A is kept closed and shut-off damper 86B is kept open, whereby the mixed airflow from the heating apparatus is fed into the grain dryer 100 via the normal operating outlet 84B. When heat is not required by the grain dryer, bypass damper 86A is opened and shut-off damper 86B is closed, whereby the mixed airflow from the heating apparatus is instead dumped to the ambient environment, thus avoiding a potentially detrimental or dangerous overheated state inside the grain dryer 100.

With continued reference to FIG. 11, the second embodiment also includes an inline spark arrestor 200 installed in the output section 28 of the air ducting 16 somewhere downstream of the chimney 14. In the illustrated example, the inline spark arrestor 200 is installed as a final stage of the air ducting, thus being connected between the normal operating outlet 84B of the branched output duct 82 and the fan housing 116 of the grain dryer 100. The inline spark arrestor 200 features a round duct 202 in which there resides a helically spiraled and perforated screen 204, whose shape resembles the helical flighting of an auger, but is composed of a perforated metal mesh rather than solid metal sheet or plate, and is mounted in a stationary non-rotating manner sitting statically within the round duct 202. A prototype of this design was found to be effective spark arrestor for snuffing out any remnant sparks in the mixed airflow from the biomass heater before entry to the grain dryer. Without being limited to a particular theory of operation, the helical layout of the screen is believed to impart a helically tumbling spiral path to the air current flowing through the duct, and to snuff out the sparks carried thereby as they rub against the perforated texture of the helical screen 204.

In the illustrated example, the spark arrestor 200 also features a series of perforated baffle bars 206 affixed to the helical screen 204 in spaced relation to one another along the axial length of the helical screen 204, preferably at equal intervals therealong. Each baffle bar 206 lies cross-wise of the screen, preferably spanning a full width thereacross from one of the helical screen's longitudinal edges to the other, and preferably in radial relation to the central axis of the screen's helical shape. Each baffle bar 206 stands proud of the screen's perforated surface at the localized area thereof at which the bar is mounted, preferably in perpendicular/ normal relation to that local surface area. Accordingly, each baffle bar 206 forms a perforated interruption to the airflow moving on a helical path along the screen surface, thus disrupting and snuffing out sparks carried in this airflow, while the perforated character of the baffle bar 206 still allows airflow therethrough so as not to create a full-barrier blockage of such surface-adjacent airflow, but rather a small restriction or obstruction for snuffing out any airborne sparks carried thereby.

The illustrated spark arrestor 200 includes a rectangular (or square) to round duct adapter 208 at an inlet end 202A of the round duct 202 to enable connection thereof to the normal operating outlet 84B of the branched output duct 82, which may be a rectangular (or square) duct, as shown, to enable direct coupling to the rectangular outlet 30B of centrifugal fresh air intake fan 30. At an opposing outlet end 202B of the round duct 202, in downstream relation to the helical screen 204, the spark arrestor of the illustrated embodiment further includes a perforated outlet screen 210 situated inside the round duct 202. This outlet screen 210 is shaped into a frustoconical form that is centered on the same central longitudinal axis 202C of the duct 202 as the helical screen 204. A wide end 210A of the outlet screen's frustoconical shape is situated at or near the outlet end 202B of the round duct 202, from the which the frustoconical outlet screen 210 tapers in conical fashion toward the helical screen 204, and thus terminates at a narrower end 210B that faces toward the input end 202A of the round duct 202. The outlet screen 210 is open at both ends thereof, meaning that the frustoconically shaped screen 210 delimits a smaller circular opening at the narrow end 210B thereof, and delimits a larger circular opening of generally equal size to the outlet end of the round duct 202 at its wider end 210A.

One particularly effective prototype of the spark arrestor, with good spark arrest functionality without dramatic loss of airflow CFM, featured an eight-foot length of round duct 202, a substantial majority of whose axial length was occupied by a helical screen of 24-inch pitch (axial length per turn), with baffle bars 206 mounted at 12-inch intervals to the helical screen, as measured at a midpoint of the helical screen's width. Experimentation with baffle bar placement found that placement of baffles bars at intervals between 12-inches and 18-inches was relatively effective, though this range may be varied, based on which it is predicted that baffle bar intervals of 8-inches to 24-inches would also encompass workable, but non-limiting, examples of suitable performance level. Also presented in a non-limiting context, the diameter of the round duct 202 may vary between 24-inches and 48-inches, and the perforations in the helical mesh screen 204 may vary between ¼-inch and ½-inch.

The helical screen 24 of the prototype was produced in sections, in similar fashion to manufacture of sectional auger flighting, but using perforated, rather than solid, metal sheet or plate. First, a set of round annular blanks of perforated metal sheet or plate are cut, each having a central hole and a radial slot emanating therefrom to an outer perimeter of the blank, thereby forming a radially-slit annular disc. Each slitted disc is then die pressed in a manner forcing the two free edges of the slit in opposing directions along a central axis of the disc, whereby each disc forms a respective partial helical coil or pitch section, and these pitch sections are then welded together end-to-end to the form the overall helical screen 204. The baffle bars 206 are then welded at regular intervals to the assembled helical screen 204. Each baffle bar 206 may comprise a perforated piece of metal angle, the L-shaped cross section of which has one leg placed flat against the surface of the helical screen for welded fixation thereto, and the other leg of which stands proud from the screen surface for the spark arresting functionality described above.

It will be appreciated that the novel spark arrestor 200 of the present invention is not limited specifically to its disclosed context installed between a biomass furnace and a grain dryer 100, and may additionally or alternatively be used in any variety of applications where such spark arresting action on a ducted airflow may be useful, and is not limited to particular application to the output of a biomass furnace. Likewise, though the novel heating apparatus of the present invention is particularly useful as a heat source for a grain dryer, where the mixture of the combustion exhaust with fresh ambient air is necessary because the temperature of the combustion exhaust alone would be too excessive (e.g. 1400-1800° F.) for temperature-sensitive consumable grains, it will be appreciated that the same heating apparatus may alternatively be used to dry other particulate materials, whether temperature sensitive or not, for example including granular fertilizer, and gypsum, which are less susceptible to high-temperature degradation. Accordingly, while the forgoing embodiments describe ducting of the mixed airflow output of the biomass furnace to the intake fan housing 116 of a grain dryer 100, it will be appreciated that the mixed airflow output may be ducted to any variety of dryer, regardless of the particular material being dried therein, the particular structure of the dryer, and the particular component (e.g. fan housing 116) of the dryer that serves as the air intake point thereof through which the mixed airflow from the biomass furnace is introduced. The furnace can be scaled in size to suit a variety of heating applications of varying scale, for example between 1 MBtu and 35 MBtu, inclusive.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A heating apparatus for supplying heated air to a dryer for particulate materials, said heating apparatus comprising:
    a biomass furnace comprising a burn chamber having an interior space in which combustible biomass material is receivable and combustible to generate heat; and
    a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;
    air ducting having an output end connected or connectable to the dryer, said air ducting being in fluid communication with the chimney at a location upstream from said output end to enable redirection of said heated exhaust air from the chimney to the dryer via said air ducting;
    a fresh air inlet in fluid communication with both the air ducting and the surrounding ambient environment to admit fresh ambient air from said surrounding environment for mixture with the heated exhaust air to create a mixed airflow composed of both said heated exhaust air and said fresh ambient air; and
    an airflow control system configured to control said mixed airflow to the dryer through said air ducting, including temperature control of said mixed airflow by varying a ratio of said fresh ambient air to said heated exhaust air within said airflow;
    wherein said biomass furnace comprises:
        a chain grate in the burn chamber operable as a moving support atop which a bed of said combustible biomass material can be held, and advanced in a travel direction through the burn chamber on a top run of said chain grate;
        airflow openings in the chain grate that permit airflow upwardly therethrough into the bed of said combustible biomass material when held thereatop; and
        an underbed air circulation fan configured to generate underbed air circulation that moves upwardly through the airflow openings of the chain grate at the top run thereof and into the bed of combustible biomass when held thereatop, said underbed air circulation fan being positioned and aimed to blow said underbed air circulation in a direction of reverse relation to the travel direction of the bed of the combustible biomass material;
        an overbed air circulation fan operable to output overbed air circulation at a greater elevation than both the top run of the chain grate and the underbed air circulation fan.

2. The apparatus of claim 1 wherein, in the travel direction in which the bed of the combustible biomass material is advanced by the top run of the chain grate, the underbed air circulation fan is positioned beyond a terminal end of the chain grate from which resultant ash, derived from combustion of said combustible biomass material, falls from the top run of the chain grate during operation thereof.

3. The apparatus of claim 1 wherein the underbed circulation fan is configured to introduce air into the chain grate at an elevation below the top run of the chain grate, but above a bottom run thereof.

4. A heating apparatus for supplying heated air to a dryer for particulate materials, said heating apparatus comprising:
a biomass furnace comprising a burn chamber having an interior space in which combustible biomass material is receivable and combustible to generate heat; and
a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;
air ducting having an output end connected or connectable to the dryer, said air ducting being in fluid communication with the chimney at a location upstream of said output end to enable redirection of said heated exhaust air from the chimney to the dryer via said air ducting;
a fresh air inlet in fluid communication with both the air ducting and the surrounding ambient environment to admit fresh ambient air from said surrounding environment for mixture with the heated exhaust air to create a mixed airflow composed of both said heated exhaust air and said fresh ambient air; and
an airflow control system configured to control said mixed airflow to the dryer through said air ducting, including temperature control of said airflow by varying a ratio of said fresh ambient air to said heated exhaust air within said airflow;
wherein the airflow control system includes an intake fan cooperatively installed with the air ducting at a position of upstream relation to the outlet end of the air ducting and downstream relation to the fresh air inlet in order to both draw the fresh ambient air into the air ducting and blow the mixed airflow air onward through said air ducting in a downstream direction toward to the dryer, and the intake fan is installed atop the furnace in neighboring relationship to the chimney.

5. The apparatus of claim 4 in combination with said dryer, wherein the output end of said air ducting is connected to the grain dryer at an air intake thereof that is in fluid communication with an internal grain space of the dryer to which grain is introduced for drying, whereby the airflow from the biomass furnace is fed into said internal grain space for direct drying of the grain by permeation of said airflow through the grain.

6. The apparatus of claim 4 wherein said intake fan is situated downstream of the chimney.

7. The apparatus of claim 4 wherein said fresh air inlet is situated upstream of the chimney.

8. The apparatus of claim 4 in combination with the dryer.

9. The apparatus of claim 4 wherein the chimney has an open upper end and the intake fan is operable to draw ambient air into the air ducting through the open upper end of the chimney.

10. The apparatus of claim 9 wherein said open upper end of the chimney resides directly overhead of the lower end thereof, which opens directly into the burn chamber.

11. The apparatus of claim 9 wherein said open upper end of the chimney resides directly overhead of the furnace.

12. The apparatus of claim 4 wherein the fresh air inlet is a damper-equipped inlet installed atop the furnace in neighboring relationship to the chimney.

13. The apparatus of claim 4 comprising a stoker installed at an end wall of the furnace for feeding the combustible biomass material into the furnace from a position externally therebeside.

14. A heating apparatus for supplying heated air to a dryer for particulate materials, said heating apparatus comprising:
a biomass furnace comprising a burn chamber having an interior space in which combustible biomass material is receivable and combustible to generate heat; and
a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;
air ducting having an output end connected or connectable to the dryer, said air ducting being in fluid communication with the chimney at a upstream of said output end to enable redirection of said heated exhaust air from the chimney to the dryer via said air ducting;
a fresh air inlet in fluid communication with both the air ducting and the surrounding ambient environment to admit fresh ambient air from said surrounding environment for mixture with the heated exhaust air to create a mixed airflow composed of both said heated exhaust air and said fresh ambient air; and
an airflow control system configured to control said mixed airflow to the dryer through said air ducting, including temperature control of said airflow by varying a ratio of said fresh ambient air to said heated exhaust air within said airflow;
wherein the airflow control system comprises an electronic controller having:
an input terminal connectable to a command signal line of the dryer over which command signals are sent concerning heat requirements of the dryer; and
one or more output terminals connected to mechanical airflow control componentry of the airflow control system for actuation thereof in response to said command signals from the dryer; and
a failsafe output terminal for wired connection to an existing heater of the dryer instead of the command signal line, the electronic controller being configured to send a failsafe activation signal, via the failsafe output terminal, to the existing heater of the dryer to command activation thereof upon failure of the heating apparatus to fulfill the heat requirements of the dryer.

15. A heating apparatus for supplying heated air to a dryer for particulate materials, said heating apparatus comprising:
a biomass furnace comprising a burn chamber having an interior space in which combustible biomass material is receivable and combustible to generate heat; and
a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;
air ducting having an output end connected or connectable to the dryer, said air ducting being in fluid communication with the chimney at a upstream of said output end to enable redirection of said heated exhaust air from the chimney to the dryer via said air ducting;

a fresh air inlet in fluid communication with both the air ducting and the surrounding ambient environment to admit fresh ambient air from said surrounding environment for mixture with the heated exhaust air to create a mixed airflow composed of both said heated exhaust air and said fresh ambient air; and an airflow control system configured to control said mixed airflow to the dryer through said air ducting, including temperature control of said airflow by varying a ratio of said fresh ambient air to said heated exhaust air within said airflow;

wherein said air ducting includes therein a spark arrestor comprising a round duct, and a perforated screen of helically coiled shape installed within said duct in a position placing a central longitudinal axis of said helically coiled shape in longitudinally lying relationship to said round duct.

16. The apparatus of claim 15 wherein the spark arrestor further comprises a series of perforated baffle bars affixed to the perforated screen of helical shape in spaced relation to one another along an axial length thereof, each baffle bar lying cross-wise of the screen of helical shape and standing proud of a perforated surface thereof.

17. A heating apparatus for supplying heated air to a dryer for particulate materials, said heating apparatus comprising:
a biomass furnace comprising a burn chamber having an interior space in which combustible biomass material is receivable and combustible to generate heat; and
a chimney attached to the furnace and having a lower end in fluid communication with the interior space of the burn chamber, and an opposing upper end situated in elevated relation to the lower end and outside the furnace to enable release of heated exhaust air from the burn chamber to a surrounding ambient environment;
air ducting having an output end connected or connectable to the dryer, said air ducting being in fluid communication with the chimney at a location upstream of said output end to enable redirection of said heated exhaust air from the chimney to the dryer via said air ducting;
a fresh air inlet in fluid communication with both the air ducting and the surrounding ambient environment to admit fresh ambient air from said surrounding environment for mixture with the heated exhaust air to create a mixed airflow composed of both said heated exhaust air and said fresh ambient air; and
an airflow control system configured to control said mixed airflow to the dryer through said air ducting, including temperature control of said airflow by varying a ratio of said fresh ambient air to said heated exhaust air within said airflow;
a chain grate in the burn chamber operable as a moving support atop which a bed of said combustible biomass material can be held, and advanced in a longitudinal travel direction through the burn chamber on a top run of said chain grate;
wherein the burn chamber is subdivided into multiple sub-chambers of differing elevation from one another by a divider wall that overlies the chain grate in spaced relation thereover, spans fully across the burn chamber in a lateral direction thereof that is perpendicular to the longitudinal travel direction, spans a majority length of the burn chamber in the longitudinal travel direction from a first end of the burn chamber to a break or opening in the divider wall that resides nearer to an opposing second end of the burn chamber, and thereby blocks direct exhausting of the heated exhaust from the chain grate to the chimney, and forces an indirect exhaust path therebetween.

18. The apparatus of claim 17 wherein the multiple sub-chambers are communicated with one another at an opening whose position is of distally spaced relation to the chimney, thereby forcing a serpentine exhaust path with at least one directional change between the chain grate and the chimney.

* * * * *